(12) United States Patent
Zagrodnicki et al.

(10) Patent No.: US 7,210,700 B2
(45) Date of Patent: May 1, 2007

(54) HINGE MECHANISM FOR INFLATABLE RESTRAINT APPARATUS

(75) Inventors: Bernard Zagrodnicki, Loison sous Lens (FR); David Charre, Lens (FR); Gregory Stamm, Sene (FR); Marc Moreau, Caen (FR); Ralf Haibach, Lille (FR)

(73) Assignee: Visteon Global Technologies, Inc, Van Buren Township, MI (US)

( * ) Notice: Subject to any disclaimer, the term of this patent is extended or adjusted under 35 U.S.C. 154(b) by 324 days.

(21) Appl. No.: 10/925,052

(22) Filed: Aug. 24, 2004

(65) Prior Publication Data

US 2006/0043701 A1 Mar. 2, 2006

(51) Int. Cl.
B60R 21/20 (2006.01)

(52) U.S. Cl. ............................... 280/728.3; 280/743.2
(58) Field of Classification Search ............. 280/728.3, 280/732, 743.2
See application file for complete search history.

(56) References Cited

U.S. PATENT DOCUMENTS

| | | | |
|---|---|---|---|
| 5,211,421 A | 5/1993 | Catron et al. | |
| 5,332,257 A | 7/1994 | Rogers et al. | |
| 5,372,379 A | 12/1994 | Parker | |
| 5,398,959 A | 3/1995 | Avila | |
| 5,398,960 A | 3/1995 | Ravenberg et al. | |
| 5,398,961 A | 3/1995 | Rogers et al. | |
| 5,419,583 A * | 5/1995 | Sakakida et al. | 280/728.2 |
| 5,439,246 A | 8/1995 | Ravenberg et al. | |
| 5,447,327 A | 9/1995 | Jarboe et al. | |
| 5,496,060 A | 3/1996 | Whited et al. | |
| 5,533,746 A | 7/1996 | Whited | |
| 5,536,043 A | 7/1996 | Lang et al. | |
| 5,544,912 A | 8/1996 | Sommer | |
| 5,564,731 A | 10/1996 | Gallagher et al. | |
| 5,613,701 A | 3/1997 | Bentley et al. | |
| 5,647,607 A | 7/1997 | Bolieau | |
| 5,651,562 A | 7/1997 | Hagen et al. | |
| 5,813,693 A | 9/1998 | Gordon et al. | |
| 5,816,609 A | 10/1998 | Gray et al. | |
| 5,941,558 A | 8/1999 | Labrie et al. | |
| 5,979,929 A | 11/1999 | Stanger et al. | |
| 5,997,030 A | 12/1999 | Hannert et al. | |
| 6,045,154 A | 4/2000 | Walton et al. | |
| 6,089,642 A | 7/2000 | Davis, Jr. et al. | |
| 6,131,943 A | 10/2000 | Breitweg | |
| 6,131,945 A | 10/2000 | Labrie et al. | |
| 6,145,871 A | 11/2000 | Davis, Jr. et al. | |

(Continued)

FOREIGN PATENT DOCUMENTS

WO WO 2004009410 A1 * 1/2004

Primary Examiner—Paul N. Dickson
Assistant Examiner—Drew J. Brown
(74) Attorney, Agent, or Firm—Brinks Hofer Gilson & Lione

(57) ABSTRACT

An inflatable restraint apparatus provides deployment in a very short duration while at the same time controlling and decelerating the moving parts upon deployment. The apparatus includes an interior panel and an airbag deployment door formed in the interior panel and designed to break free from the panel upon deployment of the airbag. An airbag chute is suitably supported behind the employment door and directs deployment of the airbag outwardly towards the deployment door. A metal hinge connects the airbag chute and the deployment door, and is structured to control and decelerate the door during deployment.

22 Claims, 3 Drawing Sheets

U.S. PATENT DOCUMENTS

| | | |
|---|---|---|
| 6,149,187 A | 11/2000 | Single et al. |
| 6,158,763 A | 12/2000 | Dominique et al. |
| 6,203,056 B1 | 3/2001 | Labrie et al. |
| 6,378,894 B1 | 4/2002 | Trevino et al. |
| 6,457,738 B1 | 10/2002 | Labrie et al. |
| 6,467,800 B1 | 10/2002 | Bey et al. |
| 6,533,312 B1 | 3/2003 | Labrie et al. |
| 6,565,115 B2 | 5/2003 | Streck |
| 6,568,705 B2 | 5/2003 | Kinane |
| 6,601,870 B2 | 8/2003 | Suzuki et al. |
| 6,623,029 B2 | 9/2003 | Sun et al. |
| 6,692,017 B2 | 2/2004 | Taoka et al. |
| 6,719,320 B2 | 4/2004 | Gray et al. |
| 6,742,804 B2 | 6/2004 | Suzuki et al. |
| 2002/0003343 A1 | 1/2002 | Kansteiner |
| 2003/0085555 A1 | 5/2003 | Segura |
| 2003/0127836 A1 | 7/2003 | Bisognin et al. |
| 2004/0004343 A1 | 1/2004 | Pinsenschaum et al. |
| 2004/0041374 A1 | 3/2004 | Fujii |
| 2004/0056455 A1 | 3/2004 | Nishijima et al. |
| 2004/0075251 A1 | 4/2004 | Fujii et al. |
| 2006/0017268 A1* | 1/2006 | Bondoerffer ................ 280/732 |

* cited by examiner

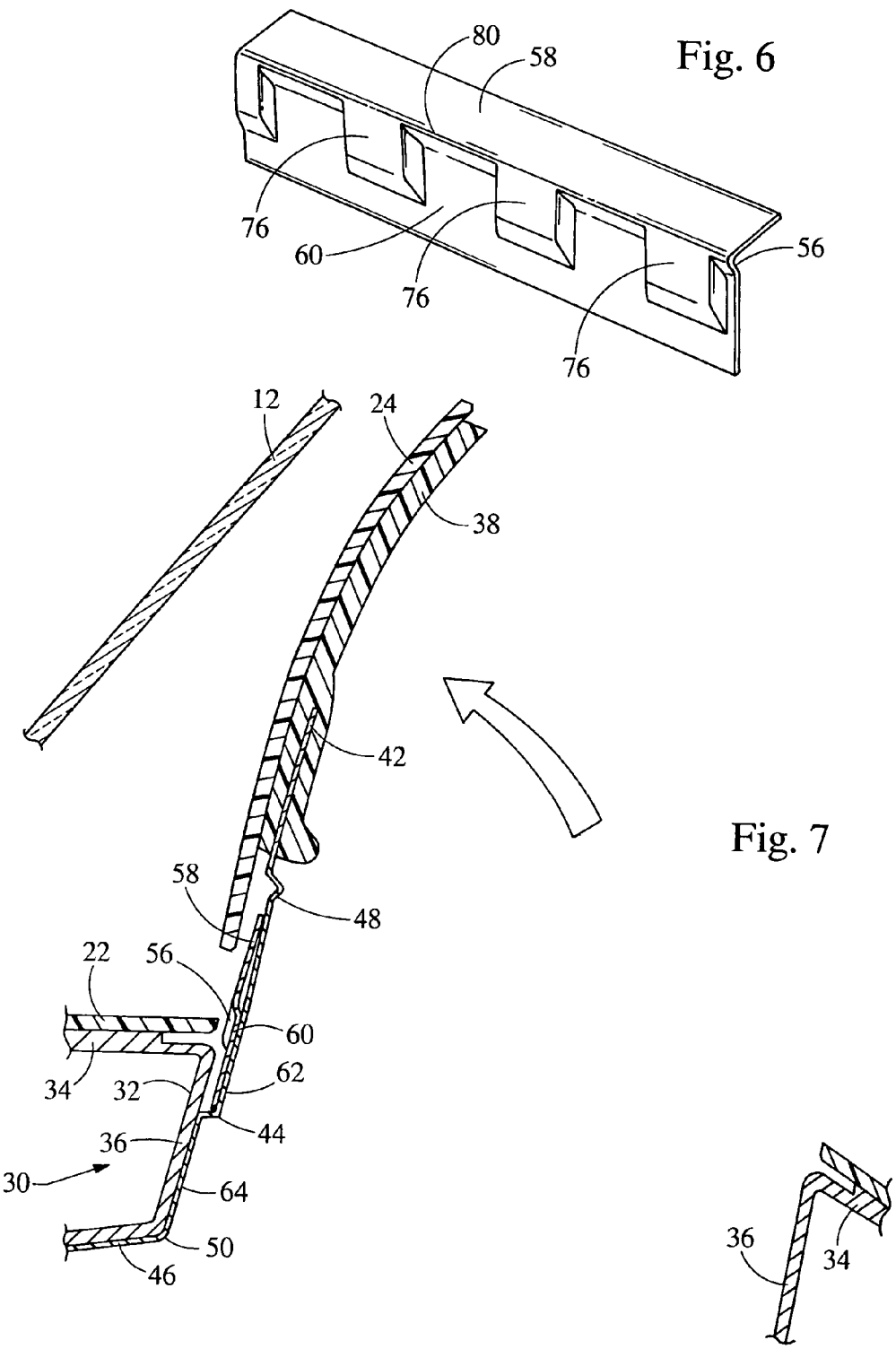

HINGE MECHANISM FOR INFLATABLE RESTRAINT APPARATUS

FIELD OF THE INVENTION

The present invention relates to an inflatable restraint apparatus for an automotive vehicle, and more particularly relates to controlled opening of the apparatus upon deployment of an airbag.

BACKGROUND OF THE INVENTION

Most modern vehicles include inflatable restraint apparatus having deployable airbags positioned in many locations throughout an automotive vehicle. Generally, an interior panel includes a deployment door formed into the panel which is designed to break free upon deployment of the airbag. A supporting structure behind the interior panel typically contain flexible tethers or metal hinges, which in combination with the deployment door are designed to let the airbag deploy in a very short duration.

Unfortunately, these inflatable restraint apparatus are subjected to often conflicting requirements. A primary aim of the apparatus is to deploy the airbag very quickly. At the same time, it is desirable to control the opening of the deployment door to avoid break explosion and the possibility of flying parts. Accordingly, there exists a need to provide an inflatable restraint apparatus which permits deployment of the airbag in a very short duration, while at the same time allowing for control and deceleration of the deployment door.

BRIEF SUMMARY OF THE INVENTION

The present invention provides an inflatable restraint apparatus having a deployable airbag which provides deployment in a very short duration while at the same time controlling and decelerating the moving parts upon deployment. The apparatus includes an interior panel and an airbag deployment door formed in the interior panel and designed to break free from the panel upon deployment of the airbag. An airbag chute is suitably supported behind the employment door and directs deployment of the airbag outwardly towards the deployment door. A metal hinge connects the airbag chute and the deployment door, and is structured to control and decelerate the door during deployment.

The hinge has a first transition area and a second transition area independent of one another. The first transition area interconnects a first hinge portion and a second hinge portion, while the second transition area interconnects the second hinge portion and a third hinge portion. The first hinge portion is connected to the deployment door. The first transition area is structured to promote rotation of the first hinge portion relative to the second hinge portion, while the second transition area is structured to promote outward translation of the second hinge portion relative to the third hinge portion. Thus, the deployment door first moves outwardly and then rotates upon deployment of the airbag.

According to more detailed aspects, the second transition area comprises a wave structure formed into the metal hinge. The wave structure is drawn out upon deployment of the airbag to promote outward translation of the second hinge portion and deployment door. In an alternate embodiment, the second transition area comprises a rivet and a slot structure formed into the second and third hinge portions, which also allows outward movement of the second hinge portion and deployment door.

According to even further details, a corner plate is attached to the metal hinge proximate the first transition area. The corner plate is designed to limit rotation of the first hinge portion relative to the second hinge portion. In particular, the corner plate breaks the rotation of the deployment door and provides resistance relative to the hinge. The corner plate decelerates the rotation of the deployment door, but provides quick opening in the outward or Z-direction. Preferably, the corner plate is attached to the second hinge portion and overlies the first transition area. The corner plate may be designed to limit rotation of the deployment door to a position where the deployment door cannot reach a window panel of the vehicle, such as a windshield. The thickness of the corner plate as well as the formation of bulldozer tabs can be used to adjust the amount of resistance provided by the corner plate.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 6 is an enlarged perspective view of the corner plate forming a portion of the inflatable restraint apparatus depicted in FIG. 1; and FIG. 7 is a cross-sectional view of the inflatable restraint apparatus depicted in FIG. 1, but showing the last stage of opening of the apparatus.

DETAILED DESCRIPTION OF THE INVENTION

Figure 1:
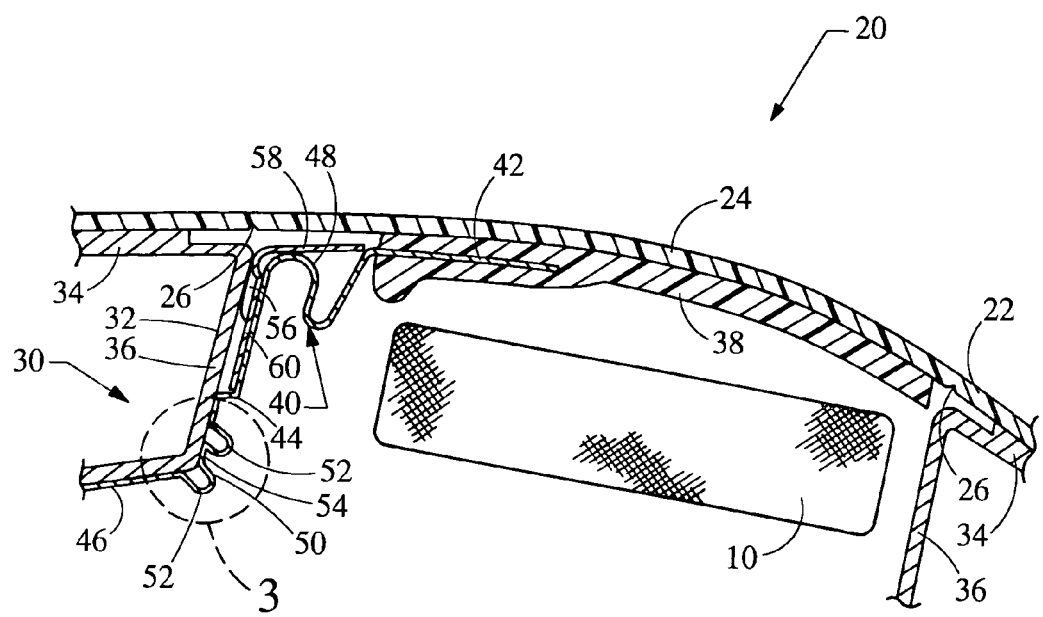
FIG. 1 is a cross-sectional view, taken from the side, of an inflatable restraint apparatus constructed in accordance with the teachings of the present invention.

Turning now to the figures, FIG. 1 depicts a cross-sectional view of an inflatable restraint apparatus 20 having an airbag 10 and constructed in accordance with the teachings of the present invention. The apparatus 20 generally includes an interior panel 22 such as an instrument panel, door panel or the like. The interior panel 22 includes an airbag deployment door 24 formed in the interior panel 22 and defined by one or more pre-weakened peripherical lines 26. The deployment door 24 is designed to break free from the interior panel 22 at the pre-weakened line 26 upon deployment of the airbag 10, as is known in the art.

An airbag mechanism 30 (having the airbag 10) includes an airbag chute 32 suitably supported behind and assembled with the interior panel 22, and specifically behind the deployment door 24. The airbag chute 32 generally includes a peripherical side wall 36 directing deployment of the airbag 10 outwardly through the chute 32. Flanges 34 are positioned proximate the interior panel 22 and may be attached thereto. An airbag cover 38 is connected to the deployment door 24, preferably by welding, although other connection mechanisms may be used.

A metal hinge 40 is used to connect the deployment door 24 to the airbag chute 32. Generally, the hinge 40 comprises a first portion 42, a second portion 44 and a third portion 46. The first hinge portion 42 is embedded within the airbag cover 38, or is otherwise suitably connected to the deployment door 24. The second hinge portion 44 extends parallel to the airbag 10 and to the lateral wall 36 of the airbag chute 32, while also being positioned inside the airbag chute 32. The third hinge portion 46 is suitably connected to the airbag chute 32. A first transition area 48 interconnects the first and second portions 42, 44 of the hinge 40, while a second transition area 50 interconnects the second and third portions 44, 46 of the metal hinge 40. The first transition area 48 is generally S-shaped (or 2-shaped) to promote rotation of the first hinge portion 42 relative to the second hinge portion 44. Thus, the first transition area 48 permits rotation of the deployment door 24 relative to the airbag chute 32. The second transition area 50 is structured to promote outward translation of the second hinge portion 44 relative to the third hinge portion 46. The second hinge portion 44 extends parallel to the airbag 10 and to the lateral wall 36 of the airbag chute 32, while also being positioned inside the airbag chute 32.

Figure 2:
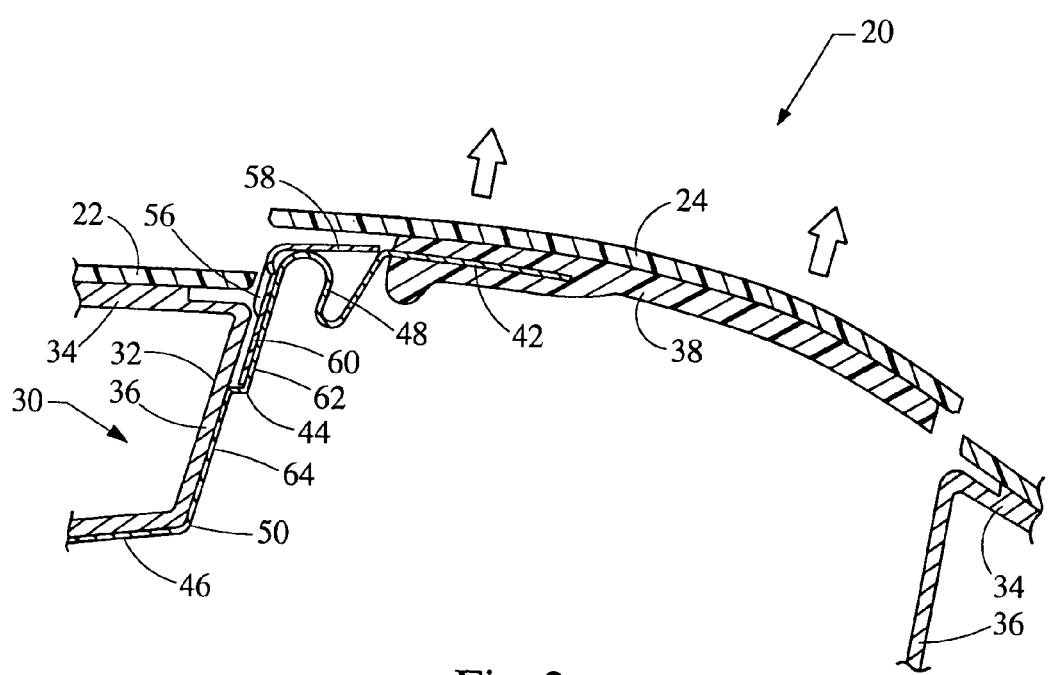
FIG. 2 is a side view similar to FIG. 1 but showing the initial outward opening of the apparatus.
Figure 3:
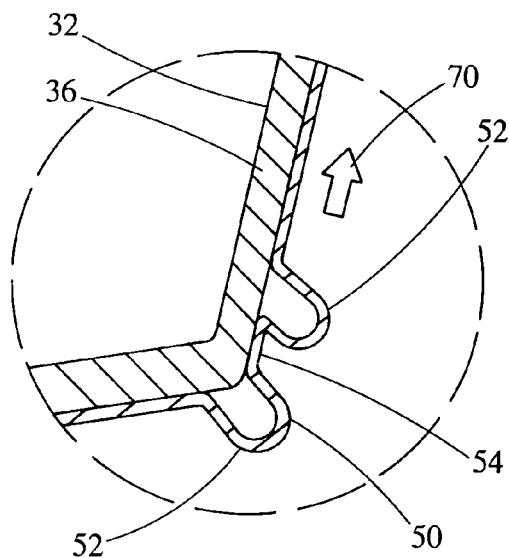
FIG. 3 is an enlarged cross-sectional view, partially cut-away, showing the hinge forming a portion of the inflatable restraint apparatus depicted in FIG. 1.

As best seen in FIG. 3, the second transition area 50 of the metal hinge 40 is positioned rearwardly from the first transition area 48 and includes a wave structure defined by a predetermined number of crests 52 connected by troughs 54. The crests 52 are angled laterally away from the chute 32 and preferably inwardly away from the deployment door 24. As will be seen with further reference to FIG. 2, upon deployment of the airbag 10, the second transition area 50 guides the opening of the deployment door 24 outwardly to provide a clean separation from the interior panel 22. That is, the wave structure 52, 54 is drawn out as shown in FIG. 2, such that the second transition area 50 extends along the side wall 36 of the airbag chute 32. In this way, the side wall 36 also guides the drawing out of the waves in conjunction with the second transition area 50.

Figure 4:
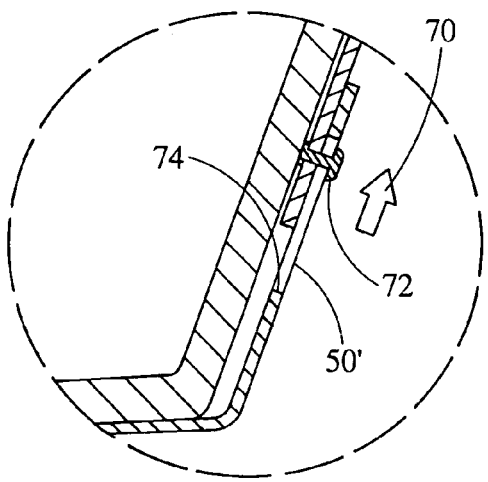
FIG. 4 is an enlarged cross-sectional view, partially cut-away, similar to FIG. 3 but showing an alternate embodiment of the hinged structure.

An alternate embodiment of the second transition area 50 has been shown in FIG. 4 and is denoted as 50'. In the figure, the second transition area 50' is comprised of multiple rivets 72 and slots 74. The rivets 72 are suitably connected to the second hinge portion 44, while the slots 74 are formed in the third hinge portion 46. It will be recognized that these working parts could be interchanged. The slots 74 are designed to cooperate with the rivets 72 to permit translation of the second hinge portion 44 outwardly relative to the third hinge portion 46. Thus, the second transition area 50', like the prior embodiment, permits outward movement of the deployment door 24. Although two embodiments for the second transition area 50, 50' have been shown in FIGS. 3 and 4, it will be recognized by those skilled in the art that numerous other structures can be employed to provide translation of the second hinge portion 44 relative to the third hinge portion 46.

Figure 5:
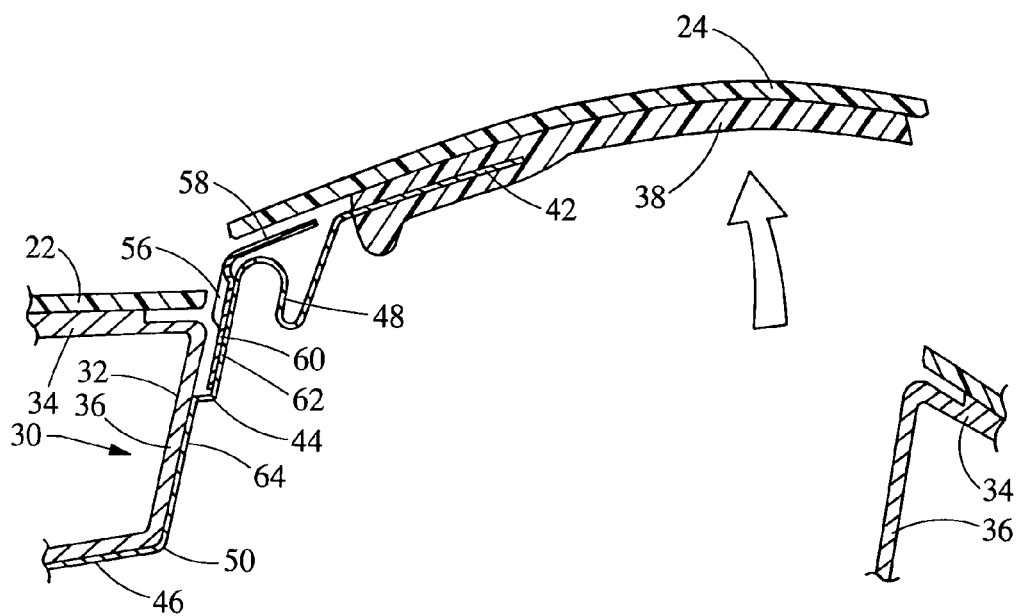
FIG. 5 is a cross-sectional view similar to FIGS. 1 and 2 but showing the middle stage of opening of the apparatus.

Once the deployment door 24 has begun moving outwardly (as indicated by the arrow 70 in FIGS. 3 and 4) the door 24 will also begin to rotate as is shown in FIG. 5. That is, the first transition area 48 of the metal hinge 40 promotes rotation of the first hinge portion 42 relative to the second hinge portion 44, and hence rotation of the deployment door 24 and airbag cover 38. In order to regulate the rotation of the deployment door 24, the inflatable restraint apparatus 20 includes a corner plate 56 which provides a braking function to the rotation.

As best seen in FIG. 6, the corner plate 56 includes a first plate portion 58 connected to a second plate portion 60. The first and second plate portions 58, 60 are disposed at an angle relative to one another and generally an angle substantially corresponding to an angle between the first hinge portion 42 and the second hinge portion 44, or alternatively the angle between the deployment door 24 and the airbag chute 32. The first and second plate portions 58, 60 are separated by a pivot line 80 which extends along the length of the corner plate 56. Additionally, bulldozer tabs 76 have been formed into the corner plate 56, and specifically the second plate portion 60 as shown in FIG. 6. The size and location of the bulldozer tabs 76, as well as the thickness of the corner plate 56, is selected so as to provide the requisite braking force.

As seen in FIGS. 1 and 2, the second hinge portion 44 includes a first section 62 and a second section 64. The first section 62 is parallel to the second section 64 and the airbag chute 32, but is spaced away therefrom to provide room for receiving the corner plate 56. The second plate portion 60 of the corner plate 56 is connected to the second hinge portion 44 by any suitable method such as welding. The first plate portion 58 is positioned to overlie the first transition area 48 of the metal hinge 40. The first plate portion 58 is not connected to the first transition area 48 or the first hinge portion 42, although this could be done (with or without disconnecting the first plate portion 58 from the second hinge portion 44) in accordance with the teachings of the present invention. In either case, the first plate portion 58 is positioned to engage the first transition area 48 to restrict the rotation of the first hinge portion 42 relative to the second hinge portion 44. That is, the corner plate 56 provides resistance relative to the hinge 40 and to the rotation of the first hinge portion 42 relative to the second hinge portion 44. In this manner, the corner plate 56 decelerates the rotation of the deployment door 24.

It will also been seen in FIG. 5 that the corner plate 56 moves outwardly with the metal hinge 40 as the second hinge portion 44 translates outwardly relative to the third hinge portion 46. As also seen in the figure, the second hinge portion 44 translates outwardly a predetermined distance corresponding to locating the pivot line 80 of the corner plate 56 in alignment with the interior panel 22. When the interior panel 22 is an instrument panel, the corner plate 56 is preferably structured to prevent the deployment door 24 and airbag cover 38 from contacting a windshield 12 of the vehicle, as is shown in FIG. 7, or from contacting another portion of the interior panel 22. It will also be seen in FIG. 7 that the first plate portion 58 has been rotated to a position generally parallel with the second plate portion 60, although more or less rotation is encompassed by the present invention. Further, the first transition area 48 has also been flattened during rotation of the deployment door 24.

Accordingly, it will be recognized by those skilled in the art that the inflatable restraint apparatus of the present invention provides deployment of an airbag in a manner which not only facilitates very short deployment time, but which also controls the deployment such that the door first moves outwardly and then rotates in a controlled manner. Further, the corner plate provides a braking function to the rotation of the deployment door to provide controlled movement and to prevent unwanted contact between the deployment door and other objects within the vehicle.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An inflatable restraint apparatus having a deployable airbag, the apparatus comprising:
   an interior panel;
   an airbag deployment door formed in the interior panel and designed to break free from the interior panel upon deployment of the airbag;
   an airbag chute suitably supported behind the deployment door and directing deployment of the airbag outwardly towards the deployment door;
   a metal hinge connecting the airbag chute and the deployment door, the hinge including a first hinge portion connected to the deployment door, a second hinge portion adjacent to the air bag chute and a third hinge portion connected to the air bag chute, the hinge having a first transition area and a second transition area independent of one another, the first transition area interconnecting the first hinge portion and the second hinge portion, the second transition area being spaced inwardly from the first transition area and the deployment door and interconnecting the second hinge portion to the third hinge portion;
   the first transition area structured to promote rotation of the first hinge portion relative to the second hinge portion;
   the second transition area structured to promote outward translation of the second hinge portion relative to the third hinge portion without significant rotation of the second hinge portion relative to the third hinge portion; and
   the deployment door first moving outwardly and then rotating upon deployment of the airbag.

2. The apparatus of claim 1, wherein the second transition area comprises a wave structure formed into the metal hinge, the wave structure being drawn out upon deployment of the airbag.

3. The apparatus of claim 2, wherein the wave structure is positioned proximate the airbag chute, and wherein the airbag chute guides the drawing out of the wave structure.

4. The apparatus of claim 2, wherein the wave structure includes at least one crest projecting laterally, the crest directed slightly inwardly.

5. The apparatus of claim 1, wherein the second transition area comprises a rivot and slot structure formed into the second and third hinge portions.

6. The apparatus of claim 1, wherein the second transition area is positioned proximate the airbag chute, the airbag chute guiding the movement of the second hinge portion relative to the third hinge portion.

7. The apparatus of claim 1, wherein the first transition area comprises an S-shape formed into the metal hinge, the S-shape guiding the rotation of the first hinge portion relative to the second hinge portion.

8. The apparatus of claim 1, wherein the second hinge portion extends parallel to the airbag chute.

9. The apparatus of claim 8, wherein the second hinge portion is positioned inside the airbag chute.

10. The apparatus of claim 1, wherein the second transition area is positioned rearwardly from the first transition area.

11. The apparatus of claim 1, further comprising a corner plate attached to the metal hinge proximate the first transition area, the corner plate limiting rotation of the first hinge portion relative to the second hinge portion.

12. An inflatable restraint apparatus having a deployable airbag, the apparatus comprising:
   an interior panel;
   an airbag deployment door formed in the interior panel and designed to break free from the interior panel upon deployment of the airbag;
   an airbag chute suitably supported behind the deployment door and directing deployment of the airbag outwardly towards the deployment door;
   a metal hinge connecting the airbag chute and the deployment door, the hinge having a first transition area and a second transition area independent of one another, the first transition area interconnecting a first hinge portion and a second hinge portion, the second transition area interconnecting the second hinge portion and a third hinge portion, the first hinge portion connected to the deployment door;
   the second transition area comprising a wave structure formed into the metal hinge including at least two crests and one trough, the trough extending along the airbag chute, the wave structure being drawn out upon deployment of the airbag;
   the first transition area structured to promote rotation of the first hinge portion relative to the second hinge portion;
   the second transition area structured to promote outward translation of the second hinge portion relative to the third hinge portion; and
   the deployment door first moving outwardly and then rotating upon deployment of the airbag.

13. An inflatable restraint apparatus having a deployable air bag, the apparatus comprising:
   an interior panel;
   an air bag deployment door formed in the interior panel and designed to break free from the interior panel upon deployment of the airbag;
   an airbag chute suitably supported behind the deployment door and directing deployment of the airbag outwardly towards the deployment door;
   a metal hinge connecting the airbag chute and the deployment door, the hinge having a first transition area and a second transition, the first transition area interconnecting a first hinge portion and a second hinge portion, the second transition area interconnecting the second hinge portion and a third hinge portion, the first hinge portion connected to the deployment door;
   the first transition area structured to promote rotation of the first hinge portion relative to the second hinge portion;
   the second transition area structured to promote outward translation of the second hinge portion relative to the third hinge portion;
   a corner plate attached to the second hinge portion, the corner plate limiting rotation of the first hinge portion relative to the second hinge portion; and
   the deployment door first moving outwardly and then rotating upon deployment of the airbag, the corner plate braking the rotation of the deployment door.

14. The apparatus of claim 13, wherein the corner plate provides resistance relative to the hinge and to the rotation of the first hinge portion relative to the second hinge portion.

15. The apparatus of claim 13, wherein the corner plate decelerates the rotation of the deployment door.

16. The apparatus of claim 13, wherein the corner plate limits rotation of the deployment door to a position where the deployment door cannot reach a window panel of the vehicle, or cannot reach another portion of the interior panel.

17. The apparatus of claim 13, wherein the corner plate comprises a first plate portion and a second plate portion defining pivot line therebetween.

18. The apparatus of claim 17, wherein the first plate includes bulldozer tabs formed into the corner plate to adjust the amount of resistance.

19. The apparatus of claim 17, wherein the first plate portion is attached to the second hinge portion, and wherein the second plate portion is unattached to but overlying the first transition area of the metal hinge.

20. The apparatus of claim 19, wherein the second hinge portion translates outwardly a predetermined distance to provide clean separation of the deployment door from the interior panel.

21. The apparatus of claim 13, wherein the second hinge portion includes a section spaced away from the airbag chute, and wherein at least a portion of the corner, plate is positioned between the metal hinge and the airbag chute.

22. The apparatus of claim 13, wherein the corner plate moves outwardly with the metal hinge as the second hinge portion translates outwardly relative to the third hinge portion.

* * * * *